(12) United States Patent
Zargar et al.

(10) Patent No.: US 10,014,906 B2
(45) Date of Patent: Jul. 3, 2018

(54) ACOUSTIC ECHO PATH CHANGE DETECTION APPARATUS AND METHOD

(71) Applicant: Microsemi Semiconductor (U.S.) Inc., Austin, TX (US)

(72) Inventors: Tanmay Zargar, Austin, TX (US); Francis Chukwuemeka Onochie, Escondido, CA (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 82 days.

(21) Appl. No.: 15/272,453

(22) Filed: Sep. 22, 2016

(65) Prior Publication Data

US 2017/0093460 A1   Mar. 30, 2017

Related U.S. Application Data

(60) Provisional application No. 62/232,480, filed on Sep. 25, 2015.

(51) Int. Cl.
*H04B 3/23* (2006.01)
*G10L 21/0224* (2013.01)
(Continued)

(52) U.S. Cl.
CPC ............ *H04B 3/23* (2013.01); *G10L 21/0224* (2013.01); *H04M 3/002* (2013.01); *H04M 9/082* (2013.01); *G10L 2021/02082* (2013.01)

(58) Field of Classification Search
CPC ... G10L 21/0208; G10L 19/012; H04B 3/002; H04B 3/23; H04M 9/082

USPC ......... 324/311; 379/202.01, 388.01, 406.06, 379/406.08, 406.13, 413.01, 406.01; 381/66, 71.1; 704/205

See application file for complete search history.

(56) References Cited

U.S. PATENT DOCUMENTS

| | | | | |
|---|---|---|---|---|
| 4,068,161 | A | * | 1/1978 | Ernst .................. G01R 33/4633 324/311 |
| 6,035,034 | A | * | 3/2000 | Trump .................. H04B 3/234 379/406.06 |

(Continued)

OTHER PUBLICATIONS

International Search Report for parallel PCT/US2016/052971 dated Dec. 1, 2016 by the European Patent Office.

(Continued)

*Primary Examiner* — Gerald Gauthier
(74) *Attorney, Agent, or Firm* — Simon Kahn

(57) ABSTRACT

An acoustic echo path change detection apparatus constituted of: a time domain path change detection functionality arranged to: detect a change in a near-end acoustic echo path responsive to a time domain analysis of a near-end signal and a signal output by an acoustic echo canceller; and output an indication of the detected change, a frequency domain path change detection functionality arranged to: detect a change in the near-end acoustic echo path responsive to a frequency domain analysis of a far-end signal and the signal output by the acoustic echo canceller; and output an indication of the detected change, and a combination path change detection functionality arranged to: determine a first function of the output indication of the time domain path change detection functionality and the output indication of the frequency domain path change detection functionality; and output the determined first function.

22 Claims, 4 Drawing Sheets

(51) Int. Cl.
*H04M 3/00* (2006.01)
*H04M 9/08* (2006.01)
*G10L 21/0208* (2013.01)

(56) References Cited

U.S. PATENT DOCUMENTS

| | | | | |
|---|---|---|---|---|
| 6,125,179 | A * | 9/2000 | Wu | H04M 9/082 379/388.01 |
| 6,226,380 | B1 * | 5/2001 | Ding | H04B 3/23 379/413.01 |
| 7,480,595 | B2 | 1/2009 | Nishiyama | |
| 7,817,797 | B2 * | 10/2010 | Popovic | H04B 3/237 379/3 |
| 8,953,777 | B1 * | 2/2015 | Chhetri | H04M 9/082 379/406.08 |
| 9,042,535 | B2 * | 5/2015 | Ramalingam | H04B 3/23 379/158 |
| 9,282,195 | B2 * | 3/2016 | Xue | G10K 11/16 |
| 9,552,827 | B2 * | 1/2017 | Johnston | H04M 9/082 |
| 9,648,158 | B2 * | 5/2017 | Mani | H04M 3/002 |
| 2007/0121928 | A1 * | 5/2007 | Beaucoup | H04M 9/082 379/406.08 |
| 2008/0101622 | A1 * | 5/2008 | Sugiyama | H04M 9/082 381/66 |
| 2008/0192946 | A1 * | 8/2008 | Faller | H04M 9/082 381/66 |
| 2008/0240413 | A1 | 10/2008 | Mohammad et al. | |
| 2010/0138218 | A1 * | 6/2010 | Geiger | G10L 19/02 704/205 |
| 2011/0170683 | A1 * | 7/2011 | Lu | H04M 9/082 379/406.01 |
| 2012/0136654 | A1 * | 5/2012 | Lou | H04B 3/23 704/205 |
| 2013/0129102 | A1 * | 5/2013 | Li | H04M 9/082 381/71.1 |
| 2013/0251169 | A1 * | 9/2013 | Awano | H04R 3/02 381/66 |
| 2014/0112488 | A1 * | 4/2014 | Kim | H04R 3/02 381/66 |
| 2014/0177822 | A1 * | 6/2014 | Sorensen | H04M 9/082 379/406.08 |
| 2014/0177859 | A1 * | 6/2014 | Ahgren | H04R 3/002 381/71.1 |
| 2015/0181017 | A1 * | 6/2015 | Mani | H04M 3/002 379/406.08 |
| 2016/0006880 | A1 * | 1/2016 | Lu | H04M 9/082 379/406.08 |
| 2017/0092281 | A1 * | 3/2017 | Zargar | G10L 19/012 |
| 2017/0093460 | A1 * | 3/2017 | Zargar | G10L 21/0224 |
| 2017/0118326 | A1 * | 4/2017 | Mani | H04M 3/002 |
| 2017/0208170 | A1 * | 7/2017 | Mani | H04M 3/002 |
| 2018/0077290 | A1 * | 3/2018 | Zargar | H04M 9/082 |

OTHER PUBLICATIONS

Written Opinion of the International Searching Authority for parallel PCT/US2016/052971 dated Dec. 1, 2016 by the European Patent Office.

Liu, J.; Liang, W.; Liu, R.; "A Three-Class ROC for Evaluating Doubletalk Detectors in Acoustic Echo Cancellation"; IEEE International Conference on Acoustic, Speech and Signal Processing, Apr. 2009, pp. 205-208; IEEE New York, NY.

Junghsi Lee; Hsu-Chang Huang; "A Robust Double-Talk Detector for Acoustic Echo Cancellation"; Proceedings of the International MultiConference of Engineers and Computer Scientists 2010, vol. II, Mar. 2010, pp. 1239-1242; published by International Association of Engineers, Hong Kong.

Per Ahgren; "Acoustic Echo Cancellation and Doubletalk Detection Using Estimated Loudspeaker Impulse Responses"; IEEE Transacations on Speech and Audio Processing, vol. 13, No. 6, Nov. 2005, pp. 1231-1237; IEEE New York, NY.

* cited by examiner

ACOUSTIC ECHO PATH CHANGE DETECTION APPARATUS AND METHOD

BACKGROUND

During voice telecommunication, the voice of a speaker at one end is output at the second end. The output voice is picked up by the microphone at the second end and is sent back to the speaker as an echo. In order to overcome the problem of the echo, an acoustic echo canceller is provided to estimate the acoustic echo and remove it from the signal output by the microphone. During start-up of the voice communication, the acoustic echo canceller provides rapid echo cancellation, however the rapid echo cancellation methods generally overshoot and cancel voice which is not echo. Therefore, after start-up the acoustic echo canceller enters a steady state mode where the acoustic estimation is more accurate, however response to changes is not as rapid as during the start-up.

In the event that there is a change in the acoustic echo path between the speaker and the microphone, such as when someone waves his hand in front of the microphone or speaker, the steady state of the acoustic echo canceller is unable to properly estimate the acoustic echo and the echo cancellation is less effective, causing echo on the voice communication. Therefore, an acoustic echo path change detector is provided in order to detect a change in the acoustic echo path. If a change in the acoustic echo path is detected, the acoustic echo canceller is switched to the rapid start-up mode in order to fix the acoustic echo estimation and improve the echo cancellation. Unfortunately, prior art acoustic echo path change detectors suffer from the need to trade-off between speed and accuracy of echo path change detection. As a result, fast detectors are less accurate and accurate detectors are slow. Additionally, the speed and accuracy of prior art acoustic echo path change detectors require improvement in order to improve the quality of voice communication.

SUMMARY OF THE INVENTION

Accordingly, it is a principal object of the present invention to overcome at least some of the disadvantages of prior art acoustic echo path change detectors. This is accomplished in one embodiment by an acoustic echo path change detection apparatus comprising: a time domain path change detection functionality in communication with an acoustic echo canceller, the time domain path change detection functionality arranged to: detect a change in a near-end acoustic echo path responsive to a time domain analysis of a near-end signal and a signal output by the acoustic echo canceller; and output an indication of the detected change, a frequency domain path change detection functionality in communication with the acoustic echo canceller, the frequency domain path change detection functionality arranged to: detect a change in the near-end acoustic echo path responsive to a frequency domain analysis of a far-end signal and the signal output by the acoustic echo canceller; and output an indication of the detected change, and a combination path change detection functionality arranged to: determine a first function of the output indication of the time domain path change detection functionality and the output indication of the frequency domain path change detection functionality; and output the determined first function.

In one further embodiment, the apparatus further comprises: the acoustic echo canceller; and an adaptation control functionality arranged, responsive to the output first function, to adjust the operation of the acoustic echo canceller. In another further embodiment, the time domain analysis comprises a determination of a cross correlation of a second function of the near-end signal and a third function of the acoustic echo canceller output signal. Optionally, each of the second function and the third function comprises an auto-regressive moving average.

In one further embodiment, the frequency domain analysis comprises: a frequency band separation of the acoustic echo canceller output signal into a plurality of acoustic echo canceller frequency components; a frequency band separation of the far-end signal into a plurality of far-end frequency components; for each of the plurality of frequency components, a determination of a cross power of the respective acoustic echo canceller frequency component and far-end frequency component; and for each of the plurality of frequency components, a determination of a difference between a fourth function of the respective acoustic echo canceller frequency component and a fifth function of the determined cross power, wherein the acoustic echo path change is detected responsive to the number of frequency bands where the determined difference is greater than a predetermined frequency difference threshold. Optionally, the fourth function comprises an auto-regressive moving average, and wherein the fifth function comprises a normalization with the auto-regressive moving average of the respective far-end frequency component and with an auto-regressive moving average of the respective acoustic echo canceller frequency component.

In one further embodiment the first function comprises combinational logic. In another further embodiment, the apparatus further comprises: a near-end input arranged to receive the near-end signal; a far-end input arranged to receive the far-end signal; and an echo canceller input arranged to receive acoustic echo canceller output signal.

Independently, the embodiments herein provide for an acoustic echo path change detection method, the method comprising: receiving a near-end signal; receiving a far-end signal; receiving a signal output by an acoustic echo canceller; detecting an indication of a change in a near-end acoustic echo path responsive to a time domain analysis of the received near-end signal and the received acoustic echo canceller output signal; detecting an indication of a change in the near-end acoustic echo path responsive to a frequency domain analysis of the received far-end signal and the received acoustic echo canceller output signal; determining a first function of the time domain detected indication and the frequency domain detected indication; and outputting the determined first function.

In one further embodiment, the method further comprises, responsive to the output first function, adjusting the operation of the acoustic echo canceller. In another further embodiment, the time domain analysis comprises determining a cross correlation of a second function of the received near-end signal and a third function of the received acoustic echo canceller output signal. Optionally, each of the second function and the third function comprises an auto-regressive moving average.

In one further embodiment, the frequency domain analysis comprises: separating the received acoustic echo canceller output signal into a plurality of acoustic echo canceller frequency components; separating the received far-end signal into a plurality of far-end frequency components; for each of the plurality of frequency components, determining a cross power of the respective acoustic echo canceller frequency component and far-end frequency component;

and for each of the plurality of frequency components, determining a difference between a fourth function of the respective acoustic echo canceller frequency component and a fifth function of the determined cross power, wherein the acoustic echo path change is detected responsive to the number of frequency bands where the determined difference is greater than a predetermined frequency difference threshold. Optionally, the fourth function comprises an auto-regressive moving average, and the fifth function comprises a normalization with the auto-regressive moving average of the respective far-end frequency component and with an auto-regressive moving average of the respective acoustic echo canceller frequency component. In another further embodiment, the first function comprises combinational logic.

Independently, the embodiments herein provide for an acoustic echo path change detection apparatus, comprising a programmable processor configured such that the apparatus: receives a near-end signal; receives a far-end signal; receives a signal output by an acoustic echo canceller; detects an indication of a change in a near-end acoustic echo path responsive to a time domain analysis of the received near-end signal and the received acoustic echo canceller output signal; detects an indication of a change in the near-end acoustic echo path responsive to a frequency domain analysis of the received far-end signal and the received acoustic echo canceller output signal; determines a first function of the time domain detected indication and the frequency domain detected indication; and outputs the determined first function.

In one further embodiment, the programmable processor is further configured such that the apparatus, responsive to the output first function, adjusts the operation of the acoustic echo canceller. In another further embodiment, the time domain analysis comprises a determination of a cross correlation of a second function of the received near-end signal and a third function of the received acoustic echo canceller output signal. Optionally, each of the second function and the third function comprises an auto-regressive moving average.

In one further embodiment, the frequency domain analysis comprises: a separation of the received acoustic echo canceller output signal into a plurality of acoustic echo canceller frequency components; a separation of the received far-end signal into a plurality of far-end frequency components; for each of the plurality of frequency components, a determination of a cross power of the respective acoustic echo canceller frequency component and far-end frequency component; and for each of the plurality of frequency components, a determination of a difference between a fourth function of the respective acoustic echo canceller frequency component and a fifth function of the determined cross power, wherein the acoustic echo path change is detected responsive to the number of frequency bands where the determined difference is greater than a predetermined frequency difference threshold. Optionally, the fourth function comprises an auto-regressive moving average, and wherein the fifth function comprises a normalization with the auto-regressive moving average of the respective far-end frequency component and with an auto-regressive moving average of the respective acoustic echo canceller frequency component. In one further embodiment, the first function comprises combinational logic.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1:
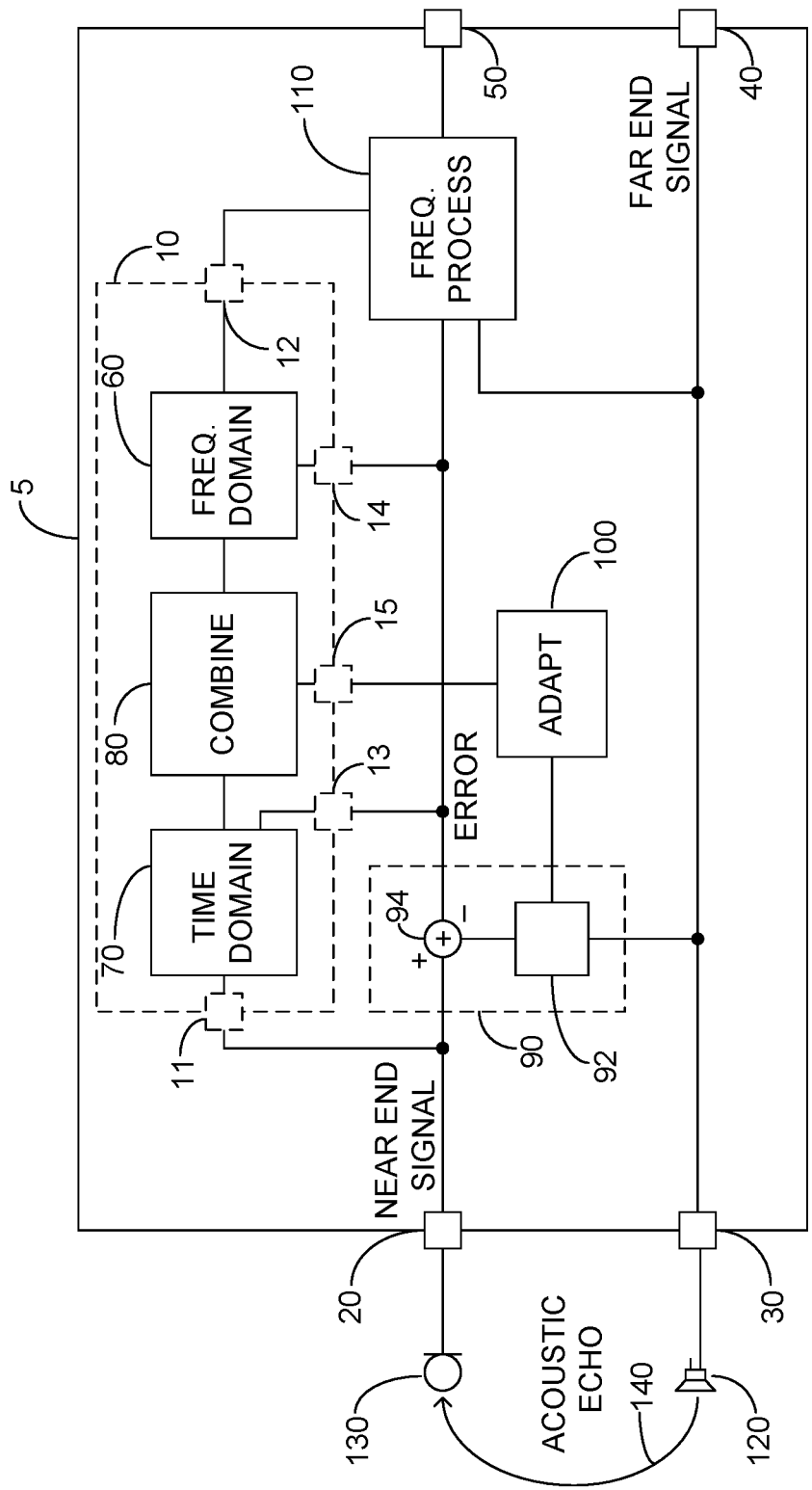
FIG. 1 illustrates a high level block diagram of a communication device comprising an acoustic echo canceller and an acoustic echo path change detection apparatus, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a communication device portion 5, comprising an acoustic echo path change detection apparatus 10; a near-end input 20; a far-end output 30; a far-end input 40; a near-end output 50; an acoustic echo canceller 90 comprising an acoustic echo estimation functionality 92 and an adder 94; an adaptation control functionality 100; and a frequency domain processing functionality 110. Acoustic echo path change detection apparatus 10 comprises: a near-end input 11; a far-end input 12; an echo canceller input 13; an echo canceller input 14; an indication output 15; a frequency domain path change detection functionality 60; a time domain path change detection functionality 70; and a combination path change detection functionality 80. Communication device portion 5 is located within a voice communication device, such as a telephone. Acoustic echo canceller 90, adaptation control functionality 100, frequency domain processing functionality 110, frequency domain path change detection functionality 60, time domain path change detection functionality 70 and combination path change detection functionality 80 are each implemented as any of an ASIC functionality, dedicated analog functionality, or as instructions stored on a memory and arranged to be implemented by a processor.

Near-end input 20 is coupled to: a microphone 130; a respective input of time domain path change detection functionality 70 via near-end input 11 of acoustic echo path change detection apparatus 10; and a respective input of adder 94 of acoustic echo canceller 90. An output of adder 94 is coupled to: a respective input of time domain path change detection functionality 70 via echo canceller input 13; a respective input of frequency domain path change detection functionality 60 via echo canceller input 14; and a first input of frequency domain processing functionality 110. An output of frequency domain processing functionality 110 is coupled to near-end output 50. An output of each of frequency domain path change detection functionality 60 and time domain path change detection functionality 70 is coupled to a respective input of combination path change detection functionality 80. An output of combination path change detection functionality 80 is coupled to a respective input of adaptation control functionality 100 via indication output 15. Far-end input 40 is coupled to: far-end output 30; an input of frequency domain processing functionality 110; and a respective input of acoustic echo estimation functionality 92 of acoustic echo canceller 90. An output of frequency domain processing functionality 110 is coupled to a respective input of frequency domain path change detection functionality 60 via far-end input 12. Far-end output 30 is in communication with a speaker 120, which is acoustically coupled with microphone 130 via acoustic echo path 140. The above has been described in an embodiment where acoustic echo path change detection apparatus 10 comprises a plurality of terminal inputs and outputs, however this is not meant to be limiting in any way. In another embodiment, the connections to frequency domain path change detection functionality 60, time domain path change detection functionality 70 and combination path change detection functionality 80, or a portion thereof, are direct without intermediating terminals.

In operation, a far-end signal is received at far-end input 40. Particularly, the far-end signal is a digital, or analog, representation of a voice received at a microphone at a voice telecommunication device in communication with communication device 5, such as a telephone in communication with the telephone comprising acoustic echo change detection apparatus 10. Similarly, a near-end signal is received at near-end input 20. Particularly, the near-end signal is a digital, or analog, representation of a voice received by microphone 130.

The received far-end signal is acoustically output by speaker 120 and picked up by microphone 130 after passing through near-end acoustic echo path 140, i.e. the acoustic path coupling speaker 120 and microphone 130. As a result, the near-end signal further comprises a delayed and attenuated version of the far-end signal which was output by speaker 120. Acoustic echo canceller 90 is arranged to reduce the acoustic echo on the near-end signal, as known to those skilled in the art at the time of the invention. Particularly, acoustic echo estimation functionality 92 is arranged to estimate the acoustic echo within the near-end signal by estimating the time it will take for the far-end signal to be picked up by microphone 130 and the attenuation thereof along near-end acoustic echo path 140. The estimation is output by acoustic echo estimation functionality 92 to adder 94. Adder 94 is arranged to remove from the near-end signal a copy of the echo estimation. The signal output by acoustic echo canceller 90 thus comprises the near-end signal with the acoustic echo of the far-end signal being cancelled out, or significantly reduced. Therefore, the signal output by acoustic echo canceller 90 will be a more accurate representation of the voice of a near-end speaker, and in the event that the near end speaker is silent, represents any non-cancelled noise plus any error remaining from the echo cancellation, as will be further explained below.

In the event that there is a change in near-end acoustic echo path 140, such as when the near-end speaker places his hand within near-end acoustic echo path 140, the time of travel and attenuation of the acoustically output far-end signal along near-end acoustic echo path 140 will change. As a result, the acoustic echo estimate of acoustic echo estimation functionality 92 will differ from the actual echo. Therefore, the signal output by acoustic echo canceller 90, denoted ERROR, will not accurately represent solely the voice received at microphone 130, and background noise, and will also include echo and/or noise induced by the failed echo cancellation.

Time domain path change detection functionality 70 is arranged to receive the near-end signal and signal ERROR, and detect a change in near-end acoustic echo path 140 responsive to a time domain analysis of the near-end signal and signal ERROR. In one embodiment, as will be described below, time domain path change detection functionality 70 is arranged to determine a cross correlation of a function of the near-end signal and a function of signal ERROR. In the event that the cross correlation value is greater than a predetermined threshold, it is determined that the echo cancellation was unsuccessful and there is still echo in signal ERROR resulting in a high correlation between the near-end signal and signal ERROR. In the event that the cross correlation value is less than the predetermined threshold, it is determined the echo cancellation was successful resulting in a low correlation between the near-end signal and signal ERROR. In other words, unsuccessful echo suppression will result in signal ERROR being similar to the near-end signal and successful echo suppression will result in signal ERROR being significantly different than the near-end signal. Determining a cross-correlation is very fast, therefore time domain path change detection functionality 70 provides a rapid detection of a change in near-end acoustic echo path 140. Responsive to a detection that a change has occurred in near-end acoustic echo path 140, time domain path change detection functionality is further arranged to output to combination path change detection functionality 80 an indication of the detected change, in one embodiment being a binary indication that a change has occurred.

Frequency domain processing functionality 110 is arranged to receive signal ERROR and convert signal ERROR from the time domain to the frequency domain, preferably by performing a fast Fourier transform (FFT). Frequency domain processing functionality 110 is further arranged to group the FFT power coefficients into frequency sub-bands, optionally 22 sub-bands based on the Bark scale, as known to those skilled in the art at the time of the invention. Within each frequency sub-band, frequency domain processing functionality 110 is further arranged to: remove noise and residual echo from signal ERROR; perform equalization; and convert the FFT power coefficients back into the time domain. The processed signal is then output from near-end output 50. In one embodiment, the processing of frequency domain processing functionality 110 is performed every 10 ms on buffers of samples of the FFT power coefficients within the respective sub-bands.

In one embodiment, frequency domain path change detection functionality 60 is arranged to receive the grouped FFT power coefficients of signal ERROR from frequency domain processing functionality 110. In another embodiment (not shown), frequency domain path change detection functionality 60 is arranged to directly receive signal ERROR and the far end signal and is further arranged to convert signal ERROR into the frequency domain and group the FFT power coefficients into the plurality of frequency sub-bands.

For each of the plurality of separated frequency components, i.e. for each frequency band, frequency domain path change detection functionality 60 is arranged to determine a cross power of the respective frequency component of signal ERROR and the respective frequency component of the far-end signal. Frequency domain path change detection functionality 60 is further arranged, for each of the plurality of separated frequency components, to determine a difference between a function of the respective frequency component and a function of the determined cross power.

For each frequency component, frequency domain path change detection functionality compares the determined difference with a predetermined threshold. In the event that the determined difference is greater than the predetermined threshold, it may indicate that there was a change in acoustic echo path 140. In the event that the number of frequency bands where the determined difference was greater than the predetermined threshold is greater than a predetermined number, frequency domain path change detection functionality 60 is arranged to output to combination path change detection functionality 80 an indication of the detected change, in one embodiment being a binary indication that a change has occurred.

Combination path change detection functionality 80 is arranged to determine a function of the received indication from frequency domain path change detection functionality 60 and the received indication from time domain path change detection functionality 70. In one embodiment, as will be described below, the function of the received indications comprises combination logic. The determined function of the received indications is then output to adaption functionality 100. Optionally, in the event that at least one of frequency domain path change detection functionality 60 and time domain path change detection functionality 70 indicates that there has been a change in acoustic echo path 140, adaption circuitry 100 is arranged to switch acoustic echo estimation functionality 92 into a more rapid mode to improve the echo estimation. In one embodiment, adaption functionality 100 is further arranged to control the modes of acoustic echo estimation functionality 92 responsive to additional detectors (not shown), such as a silence detector and a double talk detector.

Figure 2:
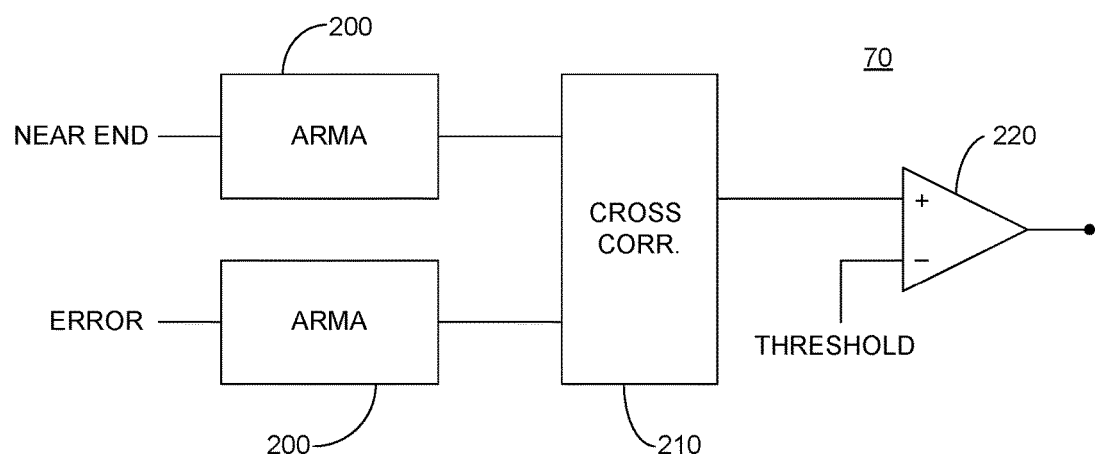
FIG. 2 illustrates a high level block diagram of a time domain path change detection functionality, according to certain embodiments.

FIG. 2 illustrates a high level block diagram of a detailed embodiment of time domain path change detection functionality 70, comprising: a pair of auto-regressive moving average (ARMA) filters 200; a cross correlation functionality 210; and a comparator 220. An input of each ARMA filter 200 is arranged to receive a respective one of the near-end signal and signal ERROR, described above in relation to communication device 5 of FIG. 1. An output of each ARMA filter 200 is coupled to a respective input of cross correlation functionality 210 and an output of cross correlation functionality 210 is coupled to a first input of comparator 220. A second input of comparator 220 is arranged to receive a threshold value, denoted THRESHOLD. In one embodiment, the threshold value is arranged to be adjustable by a user.

In operation, the near-end signal and signal ERROR are each filtered by the respective ARMA filter 200. Cross correlation functionality 210 is arranged to determine a cross correlation metric of the averaged signals. The determined cross correlation metric is compared to value THRESHOLD by comparator 220. As described above, in the event that there is significant echo on signal ERROR, the similarity between signal ERROR and the near-end signal will be higher than value THRESHOLD and comparator 220 will output a high signal. In the event that the echo on signal ERROR was successfully cancelled, the similarity between signal ERROR and the near-end signal will be lower than value THRESHOLD and comparator 220 will output a low signal. Thus, responsive to a change in acoustic echo path 140 described above, comparator 220 will rapidly output a high signal indicating that there was a change in acoustic echo path 140.

The above described embodiment of time domain path change detection functionality 70 is not meant to be limiting and other time domain analysis methods may be applied without exceeding the scope.

Figure 3:
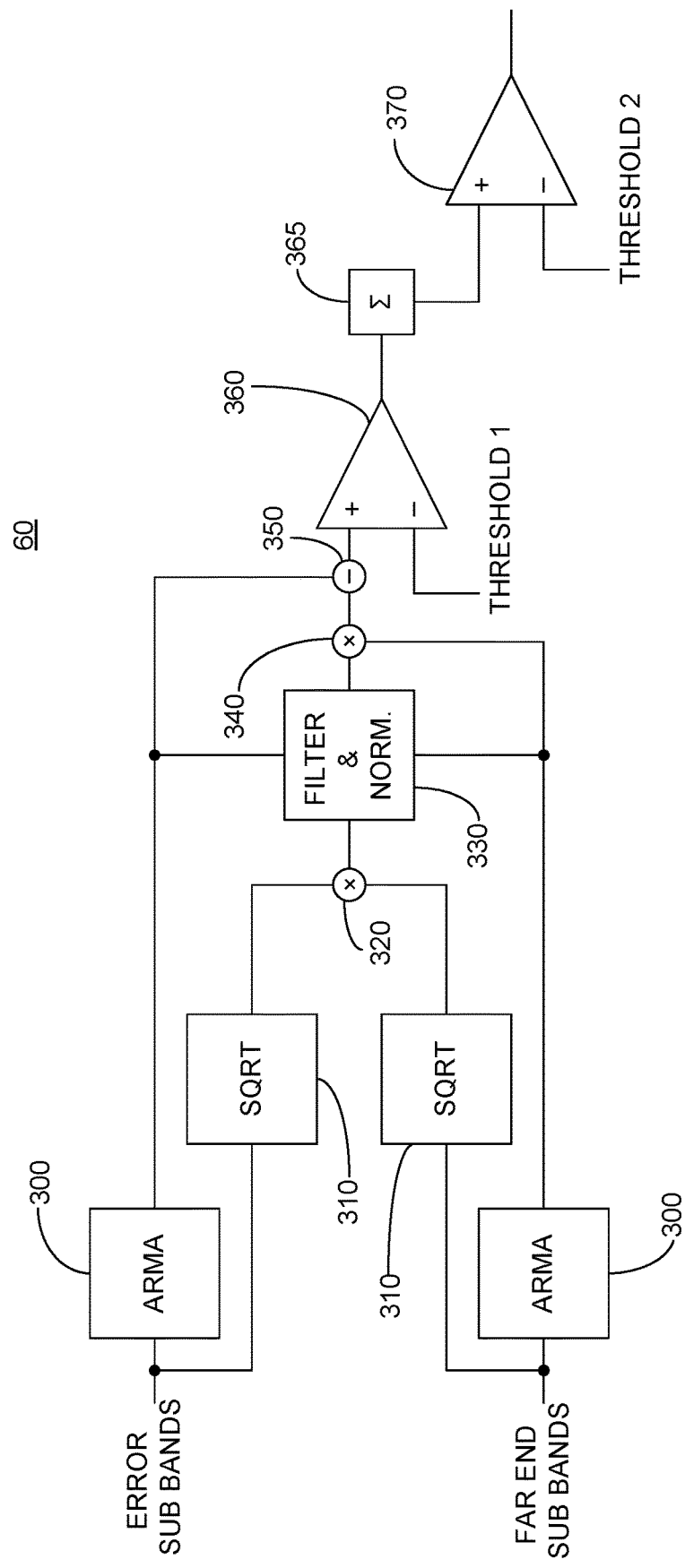
FIG. 3 illustrates a high level block diagram of a frequency domain path change detection functionality, according to certain embodiments.

FIG. 3 illustrate a high level block diagram of a detailed embodiment of frequency domain path change detection functionality 60, comprising: an ARMA filter 300; an ARMA filter 305; a pair of square root functionalities 310; a multiplier 320; a filter and normalization functionality 330; a multiplier 340; a subtractor 350; a comparator 360; an accumulator 365; and a comparator 370. An input of ARMA filter 300 is arranged to receive the sub-band powers signal ERROR, described above in relation to communication device 5 of FIG. 1. An input of ARMA filter 305 is arranged to receive the sub-band powers of the far-end signal, described above in relation to communication device 5 of FIG. 1. In one embodiment, ARMA filters 300 and 305 are arranged to receive the separated sub-bands output by frequency domain processing functionality 110 of FIG. 1. In another embodiment, the separation into the respective sub-bands is done by frequency domain path change detection functionality 60, the separate sub-bands powers received by ARMA filters 300 and 305. Similarly, an input of each square root functionality 310 is arranged to receive the frequency components of a respective one of the far-end signal and signal ERROR.

The output of each square root functionality 310 is coupled to a respective input of multiplier 320. An output of multiplier 320 is coupled to a respective input of filter and normalization functionality 330. An output of each of ARMA filters 300 and 305 is coupled to a respective input of filter and normalization functionality 330. Additionally, the output of ARMA filter 300 is further coupled to a respective input of subtractor 350 and the output of ARMA filter 305 is further coupled to a respective input of multiplier 340. An output of filter and normalization functionality 330 is coupled to a respective input of multiplier 340 and an output of multiplier 340 is coupled to a respective input of subtractor 350. An output of subtractor 350 is coupled to a first input of comparator 360 and a second input of comparator 360 is arranged to receive a predetermined threshold value, denoted THRESHOLD 1. An output of comparator 360 is coupled to an input of accumulator 365. An output of accumulator 365 is coupled to a first input of comparator 370 and a second input of comparator 370 is arranged to receive a predetermined threshold value, denoted THRESHOLD 2. In one embodiment, predetermined thresholds THRESHOLD 1 and THRESHOLD 2 are each arranged to be adjusted by a user.

In operation, square root functionalities 310 and multiplier 320 are arranged to determine a cross power of each of the received frequency components of signal ERROR and the far-end signal. Additionally, for each of the frequency sub-bands, signal ERROR power and the far-end signal power are averaged by the respective ARMA filter 300, 305 per sub-band. Filter and normalization functionality 330 is arranged to determine, for each frequency band, an auto-regressive moving average of the determined cross power. The averaged cross power is then normalized by the averaged signal ERROR and far-end signal. The averaged and normalized cross power is then multiplied by the averaged far-end signal of ARMA filter 305 at multiplier 340. Subtractor 350 is arranged to subtract the output of the multiplication of multiplier 340 from the averaged signal ERROR of ARMA filter 300. The output of subtractor 350 thus provides the residual echo within signal ERROR, i.e. the portion of the acoustic echo which was not cancelled by acoustic echo canceller 90 of communication device 5 of FIG. 1.

Comparator 360 is arranged, for each frequency sub-band, to compare the residual echo with predetermined value THRESHOLD 1 to determine if the residual echo is significant enough to indicate that there was a change in acoustic echo path 140. In the event that the residual echo for the particular frequency sub-band is greater than THRESHOLD 1, accumulator 365 is arranged to advance a stored number by 1. Thus, the combined operation of comparator 360 and accumulator 365 counts the number of frequency sub-bands where the residual echo is greater than predetermined value THRESHOLD 1. Comparator 370 is then arranged to compare the counted number of frequency sub-bands exhibiting an indication of a change in acoustic echo path 140, i.e. the generated number of accumulator 365, with predetermined value THRESHOLD 2. In the event that the number of frequency sub-bands is greater than predetermined value THRESHOLD 2, frequency domain path change detection functionality 60 is arranged to output an indication of a change in acoustic echo path 140.

Figure 4:
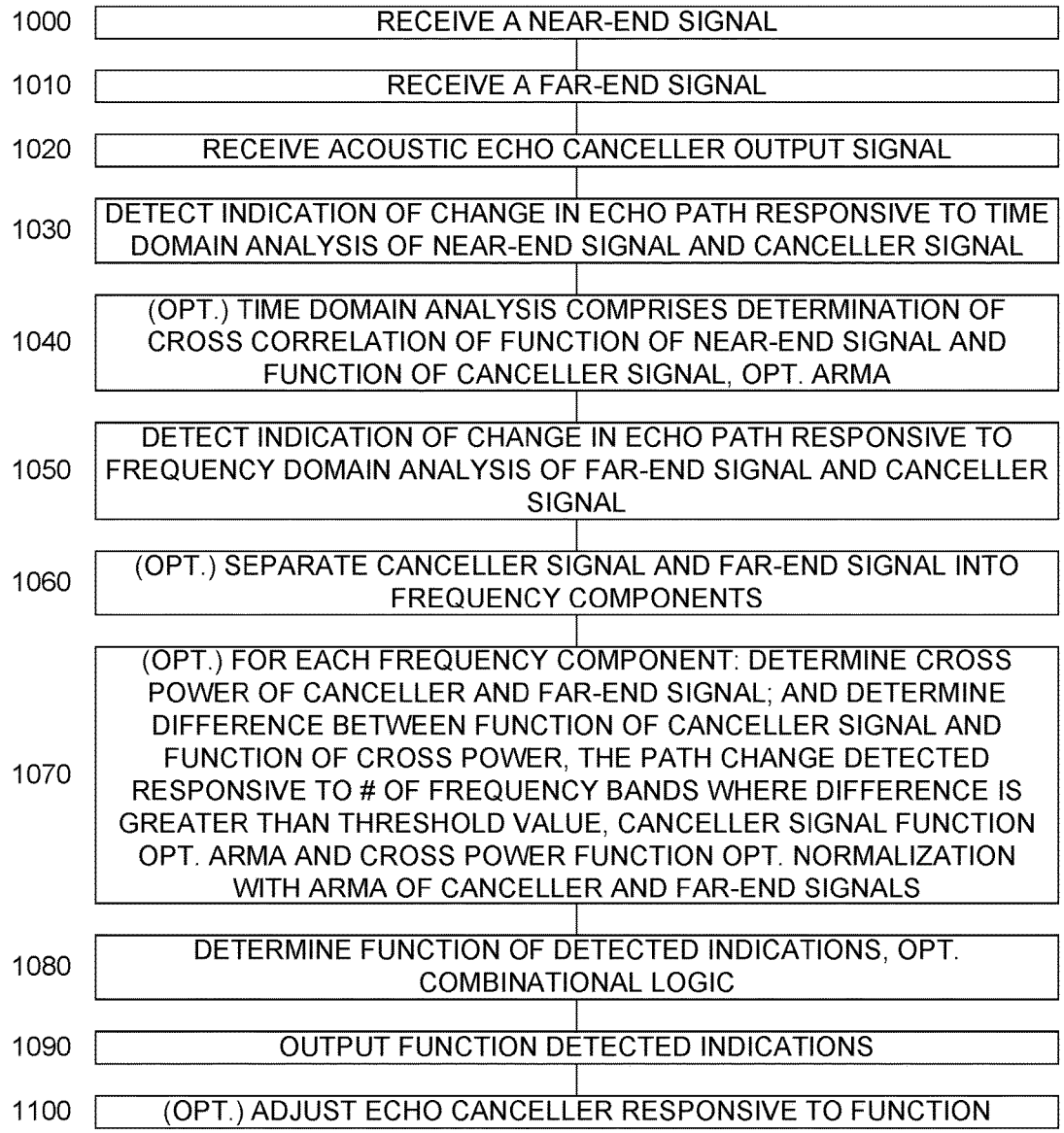
FIG. 4 illustrates a high level flow chart of an acoustic path change detection method, according to certain embodiments.

FIG. 4 illustrates a high level flow chart of an acoustic echo path change detection method. In stage 1000, a near-end signal is received. Particularly, the near-end signal is a digital, or analog, representation of acoustic waves received at a microphone of a voice communication device. In stage 1010, a far-end signal is received. Particularly, the far-end signal is a digital, or analog, representation of acoustic waves received at a microphone of a voice communication device communicating with the voice communication device of stage 1000. In stage 1020, an acoustic echo canceller output signal is received, the signal output by an acoustic echo canceller of the communication device of stage 1000. Particularly, the acoustic echo canceller output signal comprises the received near-end signal of stage 1000 after the acoustic echo canceller has processed the signal to remove acoustic echo caused by the received far-end signal of stage 1010.

In stage 1030, an indication of a change in a near-end acoustic echo path is detected responsive to a time domain analysis of the received near-end signal of stage 1000 and the received acoustic echo canceller output signal of stage 1020. Particularly, the near-end acoustic echo path is the acoustic path between the speaker and microphone of the communication device of stage 1000. The far-end signal is output at the speaker and picked back up by the microphone after travelling via the acoustic echo path.

In optional stage 1040, the time domain analysis comprises a determination of a cross correlation of a function of the received near-end signal of stage 1000 and a function of the received acoustic echo canceller output signal of stage 1020. Optionally, the function of each of the received near-end signal and the received acoustic echo canceller output signal is an auto-regressive moving average. In one embodiment, the cross correlation value is compared to a predetermined threshold value, and in the event that the cross correlation value is greater than the threshold value an indication of an acoustic echo path change is output.

In stage 1050, an indication of a change in the near-end acoustic echo path of stage 1040 is detected responsive to a frequency domain analysis of the received far-end signal of stage 1010 and the received acoustic echo canceller output signal of stage 1020.

In optional stage 1060, the received far-end signal of stage 1010 and the received acoustic echo canceller output signal of stage 1020 are each separated into a plurality of frequency components. In one embodiment, an FFT spectrum of each received signal is separated into frequency sub-bands in accordance with the Bark scale.

In optional stage 1070, for each frequency sub-band of optional stage 1060, a cross power of the received far-end signal of stage 1010 and the received acoustic echo canceller output signal of stage 1020 is determined. Additionally, for each frequency sub-band, a difference between a function of the received acoustic echo canceller output signal and a function of the determined cross power is determined. Optionally, the acoustic echo canceller output signal function comprises an auto-regressive moving average. Optionally, the cross power function comprises a normalization of auto-regressive moving average of the determined cross power with the averaged acoustic echo canceller output signal and with an auto-regressive moving average of the far-end signal. The acoustic echo path change detection of stage 1050 is responsive to the number of frequency bands where the difference between the acoustic each canceller output signal function and the cross power function is greater than a predetermined threshold value.

In stage 1080, a function of the detected indications of stages 1030 and 1050 is determined. Optionally, the function comprises combination logic. In one embodiment, the first function comprises a determination of whether at least one the time domain and frequency domain analyses indicates a change in the acoustic echo path of stage 1040, such as a logical OR.

In stage 1090, the determined function of stage 1080 is output, i.e. an indication of whether or not there was a change in the acoustic echo path of stage 1040 is output. In optional stage 1100, the operation of the acoustic echo canceller of stage 1020 is adjusted responsive to the output function of stage 1090. Optionally, the acoustic echo canceller is switched to a rapid adaptation mode to adapt to the change in the acoustic echo path.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An acoustic echo path change detection apparatus comprising:
   a time domain path change detection functionality in communication with an acoustic echo canceller, said time domain path change detection functionality arranged to:
      detect a change in a near-end acoustic echo path responsive to a time domain analysis of a near-end signal and a signal output by the acoustic echo canceller; and
      output an indication of said detected change,
   a frequency domain path change detection functionality in communication with the acoustic echo canceller, said frequency domain path change detection functionality arranged to:
      detect a change in the near-end acoustic echo path responsive to a frequency domain analysis of a far-end signal and the signal output by the acoustic echo canceller; and
      output an indication of said detected change, and
   a combination path change detection functionality arranged to:
      determine a first function of said output indication of said time domain path change detection functionality and said output indication of said frequency domain path change detection functionality; and
      output said determined first function.

2. The apparatus of claim 1, further comprising:
   the acoustic echo canceller; and
   an adaptation control functionality arranged, responsive to said output first function, to adjust the operation of said acoustic echo canceller.

3. The apparatus of claim 1, wherein said time domain analysis comprises a determination of a cross correlation of a second function of the near-end signal and a third function of the acoustic echo canceller output signal.

4. The apparatus of claim 3, wherein each of said second function and said third function comprises an auto-regressive moving average.

5. The apparatus of claim 1, wherein said frequency domain analysis comprises:
   a frequency band separation of the acoustic echo canceller output signal into a plurality of acoustic echo canceller frequency components;
   a frequency band separation of the far-end signal into a plurality of far-end frequency components;
   for each of said plurality of frequency components, a determination of a cross power of said respective acoustic echo canceller frequency component and far-end frequency component; and
   for each of said plurality of frequency components, a determination of a difference between a fourth function of said respective acoustic echo canceller frequency component and a fifth function of said determined cross power,
   wherein said acoustic echo path change is detected responsive to the number of frequency bands where said determined difference is greater than a predetermined frequency difference threshold.

6. The apparatus of claim 5, wherein said fourth function comprises an auto-regressive moving average, and
   wherein said fifth function comprises a normalization with said auto-regressive moving average of said respective far-end frequency component and with an auto-regressive moving average of said respective acoustic echo canceller frequency component.

7. The apparatus of claim 1, wherein said first function comprises combinational logic.

8. The apparatus of claim 1, further comprising:
   a near-end input arranged to receive the near-end signal;
   a far-end input arranged to receive the far-end signal; and
   an echo canceller input arranged to receive acoustic echo canceller output signal.

9. An acoustic echo path change detection method, the method comprising:
   receiving a near-end signal;
   receiving a far-end signal;
   receiving a signal output by an acoustic echo canceller;
   detecting an indication of a change in a near-end acoustic echo path responsive to a time domain analysis of said received near-end signal and said received acoustic echo canceller output signal;
   detecting an indication of a change in the near-end acoustic echo path responsive to a frequency domain analysis of said received far-end signal and said received acoustic echo canceller output signal;
   determining a first function of said time domain detected indication and said frequency domain detected indication; and
   outputting said determined first function.

10. The method of claim 9, further comprising, responsive to said output first function, adjusting the operation of the acoustic echo canceller.

11. The method of claim 9, wherein said time domain analysis comprises determining a cross correlation of a second function of said received near-end signal and a third function of said received acoustic echo canceller output signal.

12. The method of claim 11, wherein each of said second function and said third function comprises an auto-regressive moving average.

13. The method of claim 9, wherein said frequency domain analysis comprises:
   separating said received acoustic echo canceller output signal into a plurality of acoustic echo canceller frequency components;
   separating said received far-end signal into a plurality of far-end frequency components;
   for each of said plurality of frequency components, determining a cross power of said respective acoustic echo canceller frequency component and far-end frequency component; and
   for each of said plurality of frequency components, determining a difference between a fourth function of said respective acoustic echo canceller frequency component and a fifth function of said determined cross power, wherein said acoustic echo path change is detected responsive to the number of frequency bands where said determined difference is greater than a predetermined frequency difference threshold.

14. The method of claim 13, wherein said fourth function comprises an auto-regressive moving average, and wherein said fifth function comprises a normalization with said auto-regressive moving average of said respective far-end frequency component and with an auto-regressive moving average of said respective acoustic echo canceller frequency component.

15. The method of claim 9, wherein said first function comprises combinational logic.

16. An acoustic echo path change detection apparatus, comprising a programmable processor configured such that the apparatus:

receives a near-end signal;
receives a far-end signal;
receives a signal output by an acoustic echo canceller;
detects an indication of a change in a near-end acoustic echo path responsive to a time domain analysis of said received near-end signal and said received acoustic echo canceller output signal;
detects an indication of a change in the near-end acoustic echo path responsive to a frequency domain analysis of said received far-end signal and said received acoustic echo canceller output signal;
determines a first function of said time domain detected indication and said frequency domain detected indication; and
outputs said determined first function.

17. The apparatus of claim 16, wherein said programmable processor is further configured such that the apparatus, responsive to said output first function, adjusts the operation of the acoustic echo canceller.

18. The apparatus of claim 16, wherein said time domain analysis comprises a determination of a cross correlation of a second function of said received near-end signal and a third function of said received acoustic echo canceller output signal.

19. The apparatus of claim 18, wherein each of said second function and said third function comprises an auto-regressive moving average.

20. The apparatus of claim 16, wherein said frequency domain analysis comprises:

a separation of said received acoustic echo canceller output signal into a plurality of acoustic echo canceller frequency components;
a separation of said received far-end signal into a plurality of far-end frequency components;
for each of said plurality of frequency components, a determination of a cross power of said respective acoustic echo canceller frequency component and far-end frequency component; and
for each of said plurality of frequency components, a determination of a difference between a fourth function of said respective acoustic echo canceller frequency component and a fifth function of said determined cross power,
wherein said acoustic echo path change is detected responsive to the number of frequency bands where said determined difference is greater than a predetermined frequency difference threshold.

21. The apparatus of claim 20, wherein said fourth function comprises an auto-regressive moving average, and wherein said fifth function comprises a normalization with said auto-regressive moving average of said respective far-end frequency component and with an auto-regressive moving average of said respective acoustic echo canceller frequency component.

22. The apparatus of claim 16, wherein said first function comprises combinational logic.

\* \* \* \* \*